2,892,832
QUINUCLIDINE DERIVATIVES

Bernard Rudner, Silver Spring, Md., assignor to W. R. Grace & Co., New York, N.Y., a corporation of Connecticut No Drawing. Application February 25, 1958
Serial No. 717,301

8 Claims. (Cl. 260—239.1)

This invention relates to bridgehead nitrogen compounds, and in one specific aspect to quinuclidine derivatives. More particularly, it relates to those hydrazinium compounds which are N-aminoquinuclidinium salts.

A bridgehead nitrogen compound is an organic compound, the molecular structure of which contains at least two mutually fused rings sharing a common nitrogen (the bridgehead nitrogen) and at least one other atom. Although alkyl quaternary salts of these compounds are well known, heretofore, quaternary hydrazinium salts were unknown. While it may have been possible to devise a theoretical preparation of these hydrazinium salts, as a practical matter, they have never been prepared prior to my co-pending application S.N. 547,831, filed November 18, 1955, of which this application is a continuation-in-part.

It has been recently discovered that chloramine will react with tertiary amines to form 1,1,1-trisubstituted hydrazinium chlorides, G. M. Omietanski and H. H. Sisler, J. Am. Chem. Soc., 78, 1211 (1956). More recently it has been shown that hydroxylamine-o-sulfonic acid reacts with tertiary amines to yield 1,1,1-trisubstituted hydrazinium sulfates. Using these reactions on quinuclidine derivatives and by means of metathetical reactions on the resultant chlorides and sulfates, I have discovered a new generic class of useful hydrazinium compounds, the N-aminoquinuclidinium salts.

It is, therefore, an object of the present invention to provide this new generic class of hydrazinium compounds, the N-aminoquinuclidinium salts which are useful as pharmaceuticals and for other purposes and have the following general formula:

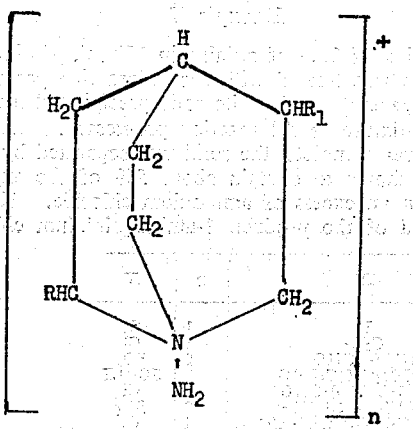

R may be hydrogen, lepidyl (quinolyl-4-methyl-), hydroxylepidyl, and lower alkoxy lepidyl. When the hydroxy substituent is present on the methyl group of lepidine, it is referred to as alpha. Otherwise, the hydroxy and alkoxy substituents are found on the benzenoid portion of the molecule. $R_1$ may be hydrogen, ethyl, vinyl, benzhydryloxy, diphenylacetoxy, benziloyloxy and the halo and lower alkoxy ring substituted derivatives of the latter three. X is a pharmaceutically acceptable anion. Since the quinoline ring in depidine substituted derivatives is basic, the compounds may be obtained in the form of their amine salts and quaternized quinolinium derivatives.

Since the N-aminoquinuclidinium compounds of this invention are made from the corresponding tertiary amines, a few remarks concerning the availability and chemistry of quinuclidine compounds would be helpful here. Quinuclidine and its simple derivatives can be synthesized from the appropriately substituted piperidines. Another approach starting with a tribromoalkyl system utilizes the simultaneous closing of two rings by means of methanolic ammonia.

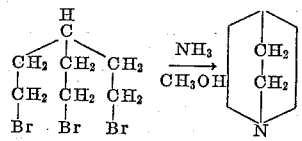

A naturally occurring source of such tertiary amines, especially the lepidyl substituted ones, is cinchona bark. The cinchona alkaloids and many of their derivatives have similar pharmacological properties. Quinine is the best known cinchona alkaloid and it will be used to illustrate the chemistry of this important group and the numbering system used here.

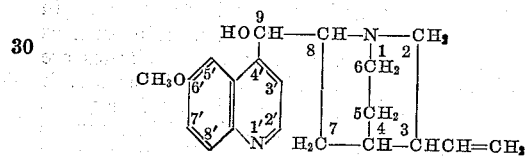

A casual inspection shows the presence of several asymmetric carbon atoms and the possibility of cis-trans isomerism with reference to the substituents on the quinuclidine ring. Not all the theoretical possibilities are achieved here because of the geometric requirements of fused ring systems. Quinidine, usually made by the isomerization of quinine, is the dextrorotatory stereoisomer of the levorotatory quinine. Apparently anti-malarial activity is not related to the direction of rotation; although instances are known where subjects were allergic to one form and not to the other. The presence of the vinyl group is physiologically unimportant. Anti-malarial activity is still present when it is replaced by hydrogen or ethyl. In fact, hydroquinine (3-ethyl) is more active than quinine itself; hydroquinidine is the corresponding dextrorotatory compound. The presence of the 9-hydroxy group appears essential to anti-malarial activity while the presence and location of lower alkoxy groups on the benzenoid ring affects the toxicity of the compounds. Cupreine is quinine where the 6'-methoxy group has been replaced by hydroxy and cinchonine is the 6'-hydrogen compound. Hydrocinchonidine is the corresponding dextrorotatory isomer of cinchonine where the vinyl group has been reduced to ethyl. In the quinine family, the substituents on the 3 and 8 positions of the quinuclidine ring are cis to each other; isomerization gives the trans quinidine family. Quinicine is another dextrorotatory isomer of quinine. Naturally occurring mixtures of cinchona alkaloids, such as totaquine, or any natural or synthetic mixture of amines are suitable for the practice of my invention provided that they contain the quinuclidine nucleus as heretofore described.

When my novel compounds are used for pharmaceutical purposes, it is necessary that the anion used be non-toxic and pharmaceutically acceptable. For reasons other than solubility or toxicity, the choice of anion is of little consequence since the primary activity of my novel compounds resides in the cation. The salts obtained by varying the anion may in some cases have special advantages due to solubility properties, ease of crystallization, lack of objectionable taste and the like. When used for other than pharmaceutical purposes, the toxicity of the particular compound selected is of little or no importance; while the solubility properties become more significant.

Typical pharmaceutically acceptable anions include bisulfate, sulfate, tartarate, acetate, o-acetoxybenzoate, halide, borate, cacodylate, camphorate, cinnamate, citrate, diethylbarbiturate, sulfanilamide, penicillate, ethylsulfate, meconate, formate, pyrophosphate, carbonate, pantothenate, lactate, oleate, stearate, mandelate, etc. Since the quinoline ring in lepidyl substituted quinuclidiniums is still basic, those compounds may be isolated as the simple amine salts such as the hydrochloride, acid sulfate, etc. or quaternized with alkyl halides. Considerations, similar to those discussed above, would apply in selecting the second anion.

The reaction of quinuclidines with chloramine and hydroxylamine-o-sulfonic acid gives the N-aminoquinuclidinium chlorides and sulfates respectively. To provide the other useful quinuclidinium salts of this invention, it is necessary to prepare salts of other anions by metathesis. For example, certain salts can be obtained by mixing aqueous solutions of the quinuclidinium chloride and simple salts containing the desired anion whereby the product quinuclidinium salt precipitates directly as the reaction progresses. In general, water insoluble salts such as iodides, diliturates, styphnates and the like can be obtained most conveniently by metathesis in aqueous solution. In certain cases the reactants have been heated together in the absence of a solvent. Many organic salts such as benzoates, acetylsalicylates, mandelates and citrates are best made in an aqueous alcohol solution. Other organic salts are more conveniently prepared in solutions where the inorganic salt formed by metathesis will be insoluble and capable of separation by filtration. The nitrates are readily prepared by mixing alcoholic solutions containing equivalent quantities of silver nitrate and the quinuclidinium chloride, filtering off the silver chloride which is quantitatively precipitated and evaporating the solution to dryness. When a highly insoluble salt is to be formed from the anion of a relatively water-soluble acid, the acid itself may be used to furnish the anion. The salts obtained by these, or other methods, are generally crystalline solids but this is dependent on the nature of the anion. Bulky organic anions such as stearate, oleate and abietate tend to give waxy or pasty products. Salts derived from simpler organic and inorganic anions which are in themselves very soluble tend to be relatively low-melting and sometimes hygroscopic solids. The quinuclidinium hydroxides, best prepared by the action of freshly precipitated silver oxide on the chloride, are extremely hygroscopic and exhibit a marked tendency to absorb carbon dioxide from the air.

The following compounds, according to the generalized quinuclidinium formula, are among those suitable for metathetical reactions:

The novel salts of my invention possess the power to depress the central nervous system and cause anesthesia. The chloramine adduct of quinidine, for example, exhibits (at 1:750 dilution) anethetic properties about equal to Procaine at the same concentrations. In addition, N-aminoquinuclidinium salts are effective anti-microbials, bactericides and fungicides.

The scope and utility of my invention is further illustrated by means of the following examples:

*Example I*

A chloramine generator was constructed according to Sisler et al. U.S. Patent No. 2,710,248. This generator produced a gaseous stream of chloramine diluted with ammonia which was used in all chloramination reactions described here. Less than the theoretical quantity of chloramine was passed into a solution of 50 g. of quinine in 500 ml. of chloroform. After standing over night, the reaction mixture was filtered from a precipitate of essentially ammonium chloride and evaporated to dryness. The crude product, a light brown solid subliming ca. 102° C. and decomposing with melting from 151–161° C., was completely soluble in water and its aqueous solution gave an insoluble fluorophosphate M.P. 131–138° C. on treatment with aqueous potassium hexafluorophosphate. The corresponding reaction with aqueous picric acid gave two insoluble picrates, the first melting 117–122° C. and the second melting with decomposition 200–208° C. These derivatives were not characterized further. The crude product was purified by dissolving it in chloroform and knocking it out by the addition of benzene. After the third treatment, the dried product (M.P. 158–162° C.) was analyzed and shown to be an almost equimolar mixture of quinine hydrochloride and the chloramine adduct of quinine. Calculated for the mixture: percent C, 65.3; percent H, 6.98; percent N, 9.48; and percent Cl, 9.62. Found: percent C, 65.9; percent H, 6.72; percent N, 9.95; and percent Cl, 9.63. It was found that the hydrochloride could be extracted from the crude product by means of repeated washings with hot benzene. A more convenient method was to dissolve the crude product in aqueous alkali, treat the solution with charcoal, filter, evaporate the water, extract the residue with chloroform, precipitate the product with benzene and repeat the cycle to get crystals melting 163–170° C. Recrystallization from isopropyl alcohol gave small needles of the product, 1-amino-3-vinyl-8-($\alpha$-hydroxy-6-methoxylepidyl)quinuclidinium chloride, melting with decomposition at 176° C.

*Example II*

A solution of 25.9 of quinine in 150 ml. of dimethylformamide was treated with the chloramine gas stream from the generator. A white solid precipitated from the reaction mixture as the reaction progressed. After the reaction was complete, the solid was separated by filtration and shown to contain about 5% of the expected product in an excess of ammonium chloride. About a 50% yield of the product, 1-aminoquininium chloride,

| Name of Quinuclidinium Cation | R | R' | n | X |
|---|---|---|---|---|
| 1-amino | H | H | 1 | Cl |
| 1-amino-3-ethyl | H | $C_2H_5$ | 1 | Cl |
| 1-amino-3-benzhydryloxy | H | $(C_6H_5)_2CHO$ | 2 | $SO_4$ |
| 1-amino-3-(4-chlorobenzhydryloxy) | H | p-$ClC_6H_4CH(C_6H_5)O$ | 1 | $SO_3OH$ |
| 1-amino-3-(4,4'-dimethoxybenzhydryloxy) | H | (p-$CH_3OC_6H_4)_2CHO$ | 1 | Cl |
| 1-amino-3-bis-(3-chlorphenyl)acetoxy | H | (m-$ClC_6H_4)_2CHCO_2$ | 2 | $SO_4$ |
| 1-amino-3-(2-methoxydiphenyl)acetoxy | H | o-$H_3COC_6H_4CH(C_6H_5)CO_2$ | 1 | Cl |
| 1-amino-3-benziloyloxy | H | $(C_6H_5)_2COHCO_2$ | 1 | Cl |
| 1-amino-8-lepidyl | $C_9H_6NCH_2$ | H | 1 | Cl |
| 1-amino-3-ethyl-8-lepidyl | $C_9H_6NCH_2$ | $C_2H_5$ | 1 | Cl |
| 1-amino-3-ethyl-8-($\alpha$-hydroxylepidyl) | $C_9H_6NCHOH$ | $C_2H_5$ | 1 | $SO_3OH$ |
| 1-amino-3-vinyl-8-($\alpha$,6-dihydroxylepidyl) | $HOC_9H_5CHOH$ | $CH=CH_2$ | 1 | Cl |
| 1-amino-8-(6-methoxylepidyl) | $CH_3OC_9H_5CH_2$ | H | 2 | $SO_4$ |
| 1-amino-3-vinyl-8-(6-methoxy-$\alpha$-hydroxylepidyl) | $CH_3OC_9H_5CHOH$ | $CH=CH_2$ | 1 | Cl |
| 1-amino-3-ethyl-8-(6-ethoxy-$\alpha$-hydroxylepidyl) | $C_2H_5OC_9H_5CHOH$ | $C_2H_5$ | 1 | Cl |
| 1-amino-3-ethyl-8-(6-i-amyloxy-$\alpha$-hydroxylepidyl) | i-$AmOC_9H_5CHOH$ | $C_2H_5$ | 1 | Cl |
| 1-amino-3-vinyl-8-(6-bromolepidyl) | $BrC_9H_5CH_2$ | $CH=CH_2$ | 1 | Cl | was obtained by evaporation of the solvent and recrystallization of the residue from hot water (after filtration from the insoluble unreacted quinine). The crude product was in the form of light brown needles which melted with decomposition from 166–168° C. It was purified by solution in aqueous caustic (pH 10), treatment with charcoal, filtration, evaporation of the water, extraction with chloroform and finally evaporation of the chloroform to leave a hygroscopic brown solid melting with decomposition from 174–176° C.

*Example III*

About 0.1 g. of the product of Example II was boiled almost to dryness with 10 ml. of constant boiling hydroiodic acid. Twenty-five ml. of water was added and the reaction mixture allowed to stand over night. The crude 1 - amino - 5 - vinyl-2-($\alpha$,6-dihydroxylepidyl)quinuclidinium iodide hydroiodide was a sticky dark solid, isolated by filtration, which decomposed at about 183° C. It was treated with 10 ml. of a 1% solution of cold aqueous sodium hydroxide and extracted with chloroform. The aqueous layer was brought to a pH of ca. 7.5 and extracted repeatedly with nitrobenzene before being evaporated to dryness. The residue was taken up in chloroform and knocked out by pouring the solution into an excess of benzene. Filtration gave the brown amorphous product, 1-amino-3-vinyl-8-($\alpha$,6-dihydroxylepidyl)-quinuclidinium iodide, decomposing at 154–156° C.

*Example IV*

The mixture of cinchona alkaloids available commercially as totaquine is described in the U.S. Dispensatory as the crystallizable extract of cinchona bark containing not less than 70% crystallizable alkaloids (at least 20% of which is quinine) and diluents such as starch, sucrose or lactose. This mixture contains chiefly cinchonine, cinchonidine, quinine and quinidine. According to the procedure of Example I, 55 g. of totaquine dissolved in 1000 ml. of chloroform was treated after filtration with approximately 0.1 mole of chloramine. The reaction mixture was filtered from the small amount of ammonium chloride formed and evaporated to dryness leaving a thick dark paste. Trituration of the paste with ether gave a pale yellow, ether insoluble, semi-crystalline solid. The 42.6 g. of mixed adducts obtained was completely soluble in water or chloroform and melted 200–205° C. Purification was effected by washing the product with hot benzene and treating its aqueous solution with sodium hydroxide to destroy any amine hydrochloride present. The work-up was essentially that of Examples I and II with final purification and crystallization being accomplished by dissolving the product in chloroform, adding it to a five-fold volume of benzene and collecting the resultant solid by filtration. Repetition of the crystallization gave the mixed N-amino-8-lepidyl-quinuclidinium chlorides melting 187–191° C; the corresponding picrates melted 127–133° C.

*Example V*

Ten ml. of an aqueous solution containing 0.1 g. of the product (chloride) of the previous example was mixed with 10 ml. of an aqueous suspension of meconic acid containing two equivalents of sodium bicarbonate per mole of meconic acid. After standing for 24 hours, the reaction mixture was evaporated at room temperature in vacuo. After washing the dry residue with chloroform, it was extracted with boiling isopropyl alcohol. On cooling there was obtained crystals of the mixed 1-amino-3-vinyl-8-($\alpha$-hydroxylepidyl) and 1-amino-3-vinyl-8 - ($\alpha$ - hydroxy - 6 - methoxylepidyl)quinuclidinium meconates decomposing 147–153° C.

*Example VI*

A solution of 3.2 g. of quinine and 1.1 g. of hydroxylamine-o-sulfonic acid in 20 ml. of methyl alcohol were warmed slightly. A spontaneous reaction resulted darkening the solution and evolving much heat. After chilling and standing over night, dark crystals of 1-amino-3-vinyl-8-($\alpha$-hydroxy-6-methoxylepidyl)quinuclidinium sulfate were collected by filtration. The product was insoluble in chloroform but soluble in hot methyl or ethyl alcohol; it decomposed at about 200° C.

*Example VII*

A solution of 25 g. of quinidine in 1000 ml. of chloroform was treated with 6 g. of chloramine from the generator. Evaporation of the filtrate gave 27 g. of the crude 1 - amino-3-vinyl-8-($\alpha$-hydroxy-6-methoxylepidyl)-quinuclidinium chloride. The product was water soluble and its aqueous solutions gave an insoluble hexafluorophosphate and an insoluble picrate. When the crude product was recrystallized from benzene-chloroform, 25 g. of off-white product, melting 178–181° C. and containing 8.45% chloride was obtained. Another recrystallization gave a product melting 187–188° C. with the following analysis: percent C, 63.5; percent H, 7.22; percent N, 10.6; and percent Cl, 10.1. Calculated for $H_{20}H_{30}ClN_3O_4$; C, 63.9; percent H, 6.97; percent N, 11.2; and percent Cl, 9.43. Since the product is higher melting than the corresponding adduct from quinine, it is presumed to have the trans quinidine configuration. Apparently quinine did not undergo isomerization under the chloramination conditions used here.

*Example VIII*

The product of the previous example (0.1 g.) and sodium o-acetoxy-benzoate (0.2 g.) were mixed well and heated at 120–125° C. for about 25 minutes. Some sintering and darkening of the reactants was observed. The solid product was continuously extracted for 4 hours with dry chloroform. Evaporation of the solvent gave 1-amino-3-vinyl-8-($\alpha$-hydroxy - 6 - methoxylepidyl)quinuclidinium o-acetoxybenzoate, an off-white powder soluble in water and alcohol and melting 181–183° C.

*Example IX*

Using the generalized procedure, 50 g. of cinchonine in 1000 ml. of xylene was treated with approximately 9 g. of chloramine giving a flaky white solid in a light green solution. After standing over night, the reaction mixture was filtered and the filtrate evaporated. The initial precipitate containing 1-amino-3-vinyl-8-($\alpha$-hydroxylepidyl)-quinuclidinium chloride and ammonium chloride (roughly 9:1) and the residue obtained from evaporating the xylene was extracted with concentrated aqueous sodium carbonate. After evaporation of the water, the new residue was recrystallized twice from nitromethane, and 30 g. of the product, 1-amino-3-vinyl-8-($\alpha$-hydroxylepidyl)quinuclidinium chloride, was isolated as the monohydrate melting with decomposition at 235–237° C. It had the following analysis: percent C, 63.0; percent H, 7.23; percent N, 11.8; and percent Cl, 9.80. Calculated for $C_{19}H_{24}ClN_3O \cdot H_2O$: percent C, 62.7; percent H, 7.21; percent N, 11.6; and percent Cl, 9.76. The picrate was prepared in the usual manner and after recrystallization from alcohol it melted 138–139° C.

*Example X*

The product of Example IX, 0.1 g. of the chloride, and 0.3 g. anhydrous potassium penicillinate were refluxed for two hours in 25 ml. of isopropyl alcohol. After filtration to remove the resultant potassium chloride, the filtrate was evaporated in vacuo leaving a pasty off-white product. The crude product was dissolved in alcohol, treated with charcoal, filtered and added to a four-fold volume of chloroform. The resultant 1-amino-3-vinyl-8-($\alpha$-hydroxylepidyl)quinuclidinium pencillinate was collected by filtration. The fine white crystals started to decompose at about 176° C. and were soluble in water, slightly soluble in acetone and insoluble in dioxane or chloroform.

Example XI

Equal quantities (0.1 g.) of sodium succinoylsulfathiazole (sulfasuxidine) and the chloramine adduct of quinine were refluxed in 20 ml. of isopropyl alcohol for 4 hours. After cooling the reaction mixture was filtered from the resultant sodium chloride and poured into 60 ml. of acetone. Filtration of the chilled solution yielded 51 mg. of the 1-aminoquininium salt of sulfasuxidine decomposing ca. 201°C.

Example XII

The results of further experiments are summarized below. Here several N-aminoquinuclidinium chlorides were treated with various salts by mixing equal volumes of their respective solutions. The reagents were used as 1% or at least saturated solutions in 50% aqueous isopropyl alcohol. The chlorides used were (a) N-aminoquininium (b) N-aminototaquininium and (c) N-aminocinchonininium. Potassium iodide gave a slow forming yellow-brown iodide precipitate with all three. Potassium ferricyanide gave the yellow-orange, light unstable ferricyanides; (b) was not used. Reaction with potassium ferrocyanide gave a yellow unstable powder in all cases. When silver nitrate was used, an immediate precipitation of silver chloride resulted. All the resultant nitrates were extremely water soluble and hygroscopic; they were isolated by evaporation of the water and solvent extraction of the residue. Sodium tannate gave an unstable brown precipitate with (a); with (b) and (c) a tan solid resulted. And on treatment with sodium phthalate, water-soluble phthalates resulted; the phthalate from (c) was only partly soluble.

Example XIII

N-aminoquininium chloride was tested at 0.01% concentration as a bactericide and as a fungicide against identical concentrations of Zephiran and phenol by means of the standard Oxford Cup technique. It was found equivalent to Zephiran (++) and better than phenol (++++) against the organisms tabulated below on the indicated growth media:

| Organism | Nutrient Agar | Nutrient Gelatin | Sabourauds Dextrose Agar | Potato Agar |
|---|---|---|---|---|
| P. aeruginosa | ++ | ++ | | |
| S. marescens | ++ | ++ | | |
| E. coli | | ++ | | |
| C. albicans | | | ++++ | ++++ |
| M. gypseum | | | ++++ | ++++ |
| C. globulosum | | | ++++ | ++++ |

I claim:
1. New chemical compounds having the general formula:

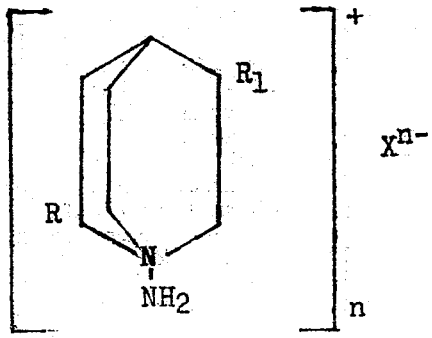

wherein R is a member selected from the group consisting of hydrogen, lepidyl, hydroxy lepidyl, lower alkoxy lepidyl and lower alkoxy hydroxylepidyl; $R_1$ is a member selected from the group consisting of hydrogen, ethyl, vinyl, benzhydryloxy, diphenylacetoxy and benziloyloxy; and X is an anion bearing the charge $n$.

2. Compounds according to claim 1 wherein R is lower alkoxy hydroxylepidyl and $R_1$ is vinyl.
3. Compounds according to claim 1 wherein R is hydroxy lepidyl and $R_1$ is vinyl.
4. N-aminoquininium sulfate.
5. N-aminoquinidinium chloride.
6. N-aminoquinidinium o-acetoxybenzoate.
7. N-aminototaquininium meconate.
8. N-aminocinchoninium penicillinate.

No references cited.